(12) United States Patent
Courter et al.

(10) Patent No.: US 10,518,486 B2
(45) Date of Patent: Dec. 31, 2019

(54) ELECTROPHOTOGRAPHY-BASED ADDITIVE MANUFACTURING WITH SUPPORT STRUCTURE AND SUPPORT STRUCTURE REMOVAL

(71) Applicant: Evolve Additive Solutions, Inc., Minnetonka, MN (US)

(72) Inventors: Blake Zachary Courter, Reading, MA (US); Zeiter Farah, Minneapolis, MN (US); Steven A. Chillscyzn, Victoria, MN (US); J. Samuel Batchelder, Somers, NY (US)

(73) Assignee: Evolve Additive Solutions, Inc., Eden Prairie, MN (US)

( * ) Notice: Subject to any disclaimer, the term of this patent is extended or adjusted under 35 U.S.C. 154(b) by 212 days.

(21) Appl. No.: 15/630,781

(22) Filed: Jun. 22, 2017

(65) Prior Publication Data
US 2018/0370155 A1    Dec. 27, 2018

(51) Int. Cl.
| | | |
|---|---|---|
| *B29C 33/44* | (2006.01) | |
| *B29C 33/52* | (2006.01) | |
| *B29C 67/00* | (2017.01) | |
| *B33Y 50/02* | (2015.01) | |
| *B29C 64/106* | (2017.01) | |
| *B29C 64/112* | (2017.01) | |
| *B29C 64/176* | (2017.01) | |
| *B29C 64/171* | (2017.01) | |
| *G03G 15/22* | (2006.01) | |
| *B29C 64/40* | (2017.01) | |
| *B29C 64/393* | (2017.01) | |
| *B29C 64/153* | (2017.01) | |
| *B29C 64/386* | (2017.01) | |
| *B29K 101/12* | (2006.01) | |
| *B33Y 80/00* | (2015.01) | |
| *B33Y 10/00* | (2015.01) | |
| *B29K 105/00* | (2006.01) | |

(52) U.S. Cl.
CPC ........ *B29C 67/0088* (2013.01); *B29C 33/448* (2013.01); *B29C 64/106* (2017.08); *B29C 64/112* (2017.08); *B29C 64/153* (2017.08); *B29C 64/171* (2017.08); *B29C 64/176* (2017.08); *B29C 64/386* (2017.08); *B29C 64/393* (2017.08); *B29C 64/40* (2017.08); *B33Y 50/02* (2014.12); *G03G 15/225* (2013.01); *B29K 2101/12* (2013.01); *B29K 2105/251* (2013.01); *B29K 2105/255* (2013.01); *B33Y 10/00* (2014.12); *B33Y 80/00* (2014.12)

(58) Field of Classification Search
CPC ....... B29C 33/44; B29C 33/448; B29C 33/52; B29C 64/10; B29C 64/106; B29C 64/112; B29C 64/171; B29C 64/176; B29C 64/40; B33Y 10/00; B33Y 40/00
USPC .......................... 264/297.1, 297.8, 308, 317
See application file for complete search history.

(56) References Cited

U.S. PATENT DOCUMENTS

| | | |
|---|---|---|
| 8,123,999 B2 | 2/2012 | Priedeman, Jr. et al. |
| 8,246,888 B2 | 8/2012 | Hopkins et al. |
| 8,260,589 B1 | 9/2012 | Kumar |
| 8,459,280 B2 | 6/2013 | Swanson et al. |
| 8,488,994 B2 | 7/2013 | Hanson et al. |
| 8,879,957 B2 | 11/2014 | Hanson et al. |
| 9,029,058 B2 | 5/2015 | Martin |
| 9,524,357 B1 | 12/2016 | Webster |
| 2008/0169585 A1 | 7/2008 | Zinniel |
| 2011/0186081 A1 | 8/2011 | Dunn et al. |
| 2011/0205583 A1 | 8/2011 | Young et al. |
| 2013/0186549 A1 | 7/2013 | Comb et al. |
| 2013/0186558 A1 | 7/2013 | Comb et al. |
| 2015/0024309 A1 | 1/2015 | Martin |
| 2016/0167306 A1 | 6/2016 | Vidimce et al. |
| 2016/0257033 A1 | 9/2016 | Jayanti et al. |

*Primary Examiner* — Leo B Tentoni
(74) *Attorney, Agent, or Firm* — Pauly, DeVries Smith & Deffner, LLC

(57) ABSTRACT

A method of printing a part using an additive manufacturing system includes identifying a part or parts to print and orienting a digital representation of the part(s) in a build volume. A digital representation of porous support structures for the part(s) is generated to form a digital representation of a part block of the part(s) to be printed. In the part block, a porosity of the support structure increases as a distance from an outer surface of the part increases within the print volume. The digital representation of the part block, including the part(s) and porous support structures, is sliced for printing.

16 Claims, 18 Drawing Sheets

ELECTROPHOTOGRAPHY-BASED ADDITIVE MANUFACTURING WITH SUPPORT STRUCTURE AND SUPPORT STRUCTURE REMOVAL

BACKGROUND

The present disclosure relates to additive manufacturing systems for printing three-dimensional (3D) parts and support structures. In particular, the present disclosure relates to printing sacrificial support structures to support a part built in a layerwise additive process.

Additive manufacturing is generally a process in which a three-dimensional (3D) object is manufactured based on a computer image of the object. The basic operation of an additive manufacturing system consists of slicing a three-dimensional computer image into thin cross sections, translating the result into two-dimensional position data, and feeding the data to control equipment which manufacture a three-dimensional structure in a layer wise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In a jetting or drop-on-demand process, a building material is jetted in droplets from a dispensing head having a set of nozzles to deposit layers on a supporting structure. Depending on the fabrication technique and material type, the layers may then be planarized, cured and/or solidified using a suitable device. The building material may include part material, which forms the object, and support material, which supports the object as it is being built.

In an electrophotographic 3D printing process, each slice of the digital representation of the 3D part and its support structure is printed or developed using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a support drum that is coated with a photoconductive material layer, where latent electrostatic images are formed by electrostatic charging following image-wise exposure of the photoconductive layer by an optical source. (Alternatively, an image may be formed using ionography by direct-writing electrons or ions onto a dialectric, and eliminating the photoconductor, all within the scope of the present invention and within the use of the electrophotography terminology as used herein). The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

In fabricating 3D parts by depositing layers of a part material, supporting layers or structures are typically built underneath overhanging portions and in cavities of objects under construction, which are not supported by the part material itself, and may also be built around sidewalls of the part. An additional geometry acting as a support structure is generated in software, and typically is sliced with the part to prepare a digital image for printing. A support structure may be built utilizing the same deposition techniques by which the part material is deposited. The support material adheres to the part material during fabrication, and is removable from the completed 3D part when the printing process is complete. In some 3D printing processes, such as an electrophotographic 3D printing process, involving utilizing pressure and temperature when transfusing each layer, the support structures also provide back pressure for a transfer medium during transfusion of imaged layers as a part is built. After a part is built, the support structure is removed from the part, for example by being dissolved or disintegrated in an aqueous solution or dispersion. Removal of the support material can be a time consuming process, significantly increasing the time to make a 3D part available for use. Further, the support material itself, as well as the removal of the support material, adds significant cost to the process of printing a 3D part.

SUMMARY

An aspect of the present disclosure is directed to generating novel support structures for supporting a part printed in a layerwise manner in an additive manufacturing system. The method includes generating a support structure having a lattice structure of increasing density as the support structure is closer to the part, for the part in a layer by layer manner, and providing a boundary surrounding the support structure. The boundary is of sufficient strength to resist deformation of the support structure during printing of a layer of the part.

Another aspect of the present disclosure is directed to a method for printing a part from part material, and a support structure from support material, with an electrophotography-based additive manufacturing system. The method includes developing a first portion of a layer with the support structure from charged support material with a first electrophotography engine, developing a second portion of the layer with charged part material with a second electrophotography engine, electrostatically attracting the developed layers from the electrophotography engine to a transfer medium, and moving the attracted layers to a layer transfusion assembly with the transfer medium. The layers of support material define a support structure that substantially encapsulates the part where the porosity of the support material increases with a distance from the part. The method includes transfusing the moved layers to previously-printed layers of the part and support structure with the layer transfusion assembly under some degree of pressure at an elevated temperature in one embodiment.

In some embodiments, the support material may vary with respect to distance from the part. In particular, the support material may taper down to a baseline level of lattice, and need not taper linearly. Further, the thickness and taper parameters can vary differently in the z and the xy slice plane directions.

Another aspect of the present disclosure includes identifying a digital representation of a part or parts to print and orienting the digital representation of the part(s) in the build volume. A digital representation of porous support structures are generated to form a digital representation of a part block to be printed. In the digital representation of the part block, a porosity of the support structure increases as a distance from a surface of the part increases within the print volume. The digital representation of the part block including the part(s) and porous support structures, is sliced and output for use in printing layers of the part and support material.

Another aspect of the present disclosure is directed to a method of printing a plurality of parts in an additive manufacturing system including identifying a plurality of parts to print, and positioning a digital representation of the plurality of parts in a build volume. A porous support structure for the plurality of identified parts is generated to form a digital representation of a part block, wherein an inner block wall is generated that is configured to be positioned about at least one of the plurality of parts and a porosity of the support structure increases as a distance from a surface of the at least one of the plurality of parts increases in a direction towards a boundary of the print volume. The method include slicing the digital representation of the part block including the plurality of identified parts and the porous support structures. Layers of the plurality of parts and support material can then be printed based upon the sliced digital representation of the part block.

Another aspect of the present disclosure is directed to a computer program product comprising non-transitory computer-executable code embodied in a non-transitory computer medium that, when executing on one or more computing devices performs the steps of: generating a digital part block file for building a part and a support structure for an additive manufacturing device, wherein a porosity of the support structure increases as a distance from an outer surface of the part; slicing the digital part block file into a plurality of slices, and outputting the plurality of slices for printing.

Definitions

Unless otherwise specified, the following terms as used herein have the meanings provided below:

The term "copolymer" refers to a polymer having two or more monomer species, and includes terpolymers (i.e., copolymers having three monomer species).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" styrene-butyl acrylate-methacrylic acid copolymer is interpreted to include one or more polymer molecules of the copolymer, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one copolymer", "one or more copolymers", and "copolymer(s)" may be used interchangeably and have the same meaning.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "porosity" refers to the volume fraction of air, other gas, or void within a given 3D part volume.

The term "permeability" refers to the connectedness of air voids within a 3D part which allow for fluid flow along different directions in all three axes. The generated support structure of the present disclosure has internal voids that providing permeability and wetting surface area that facilitates support removal by flooding the areas with a solution. In exemplary embodiments, the support structure is printed with a water soluble polymer or copolymer or a polymer or copolymer that disintegrates or dissolves in an aqueous solution or dispersion. A non-limiting exemplary water soluble or dispersible material is described in Stratasys, Inc. U.S. Pat. No. 9,557,661.

"Water soluble" as referred to herein can be used interchangeably with "disintegrable", "dispersible" and "dissolvable" and relates to materials that disintegrates in an aqueous solution or dispersion, which aqueous solution may contain any other component (such as a base e.g. sodium hydroxide or an acid) to aid in the disintegration or dissolution of the material. Upon disintegration, the support material can break apart into smaller pieces and/or particles of polymer in the aqueous solution or dispersion. Some or all of the support material may also dissolve into the aqueous solution or dispersion upon disintegration.

To dissolve or disintegrate the supports, the aqueous-based solution must be able to contact the material. Therefore, it is desirable to design the voids of the supports structure to have high porosity, permeability and wetting surface area to increase the dissolution or disintegration rates of the polymer material. A higher the wetting surface area increases the dissolution or disintegration rates relative to a lower wetting surface area. Higher dissolution or disintegration rates are desirable, as prolonged exposure of the composite part to an aqueous solution, including a basic solution, can detrimentally affect the strength of the composite part.

"Solid" as referred to herein refers to a structure which is not a liquid or a gas, and which is filled with matter throughout such that it has no hollow regions. Solid also refers to near solid materials with very few voids or hollow regions and no interconnecting pathways between any voids or hollow regions.

"Block part" or "part block" as referred to herein is one or more parts, support structures and optional boundary structures.

BRIEF DESCRIPTION OF THE DRAWINGS

FIG. 4-1 is a sectional view along section line 4-4 in FIG. 3 of a part, support structure, and boundary built according to an embodiment of the present disclosure.

FIG. 4-2 is a sectional view similar to that shown in FIG. 4-1, but with the part and support structure printed directly on a platen or build surface.

FIG. 4-3 is a diagrammatic sectional view along section line 4-4 in FIG. 3 of a part such as shown in FIG. 4-1, but including a porous support material.

FIG. 4-4 is a diagrammatic sectional view of a part and porous support structure such as shown in FIG. 4-3, but without a boundary material.

FIG. 4-5 is a diagrammatic sectional view similar to that shown in FIG. 4-4, but with the part and support structure printed directly on a platen or build surface.

FIG. 4-6 is a diagrammatic sectional view similar to that shown in FIG. 4-5, but, but without a boundary material.

FIG. 5 is a flow chart diagram of a method according to another embodiment of the present disclosure.

FIG. 6 is a front view of an example electrophotography-based additive manufacturing system for printing 3D parts, support structures, and boundaries from part, support, and boundary materials of the present disclosure.

DETAILED DESCRIPTION

Figure 1:
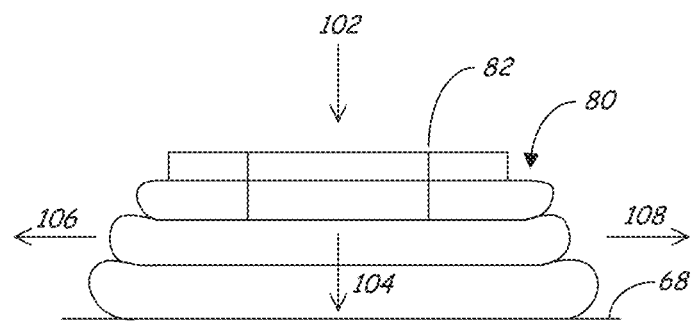
FIG. 1 is a side view of a part and support structure built according to the prior art.

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory do not include transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during an electrophotographic 3D part additive manufacturing or printing operation, electrophotographic (EP) engines develop each layer of a 3D part out of charged particle materials (e.g., polymeric toners) using the electrophotographic process. A completed layer of the 3D part may include a part portion formed of part material by one EP engine that is transferred to a suitable transfer medium, such as a transfer belt or drum, and a support structure portion formed of support material by a different EP engine that is applied to the transfer medium in registration with the corresponding part portion to form a completed layer. Alternatively, the part portion may be developed and transferred to the transfer medium in registration with a previously printed support structure portion on the transfer medium, or vice versa. In other variations, each EP engine may use a different transfer medium. In further embodiments of the present invention, imaged part and/or support material layers may be created on a transfer medium using techniques other than electrophotography. The completed layers of the 3D part are delivered to a transfusion assembly using the transfer medium where the layers are transfused together (e.g., using heat, thermal gradient and/or pressure) in an overlaying manner to build the 3D part and support structures in a layer-by-layer manner. The support structures are later dissolved or disintegrated in an aqueous solution or dispersion to reveal the completed 3D part.

The accuracy at which a 3D part may be produced using a layer transfusion process in an additive manufacturing system is limited by calibration and registration errors such as misregistration between multiple imaging engines, and overlay errors at the transfusion assembly. Registration errors relate to the accuracy at which the layers of materials are printed relative to each other on the transfer medium. Overlay errors relate to the accuracy at which a printed layer is transfused to a layer of the currently formed 3D part and support structure in proper alignment. Registration and overlay errors can prevent the part and support materials from being printed at precisely the correct locations or within a margin of error in the x-y build plane, which can reduce printing accuracies, particularly for fine-feature details. Additionally, in some situations, these errors can result in the formation of overhanging ridges in the 3D part, which can grow along the z-axis to impair part accuracies and even impact the system performance if left uncorrected. Additionally, edge positioning errors can induce crack-like surface features which substantially reduce the effective bulk strength of the fabricated parts.

The present disclosure is directed to a method for printing a part with a sacrificial support material, which can be a water-soluble material, such that the part is supported against back pressure and deformation during printing in a transfusion process. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

During the transfer of a new layer to a previously-printed layer, the pressure applied to effect the transfer of part material may be high enough that the support material, which is softer than the part material, is deformed as shown in FIG. 1. In FIG. 1, transfer of a layer of a part material 82 and support material 80 onto a previously-printed layer of support material 80 and part material 82 on a build platform 68 is shown, with the effects of the transfer shown in an exaggerated depiction. The downward pressure of the transfusion of the part material 82 is shown as arrow 102. This pressure causes previously-printed layers of the softer support material 80 to deform downward as indicated by arrow 104, and laterally, that is parallel to the build plane, as indicated by arrows 106 and 108. This deformation can cause misregistration of the layers of material, leading to a decrease in part quality or integrity. The deformation can buckle thin wall features within underlying layers, causing significant geometric distortion. Further, other kinds of deformation can occur. For example, it is possible that, nominally, the support material is not being fused to full density. In regions where the support sees higher transfuse pressure, it can densify slightly, causing it to shrink in z without apparently the illustrated deformation in the x and y directions.

Figure 2:
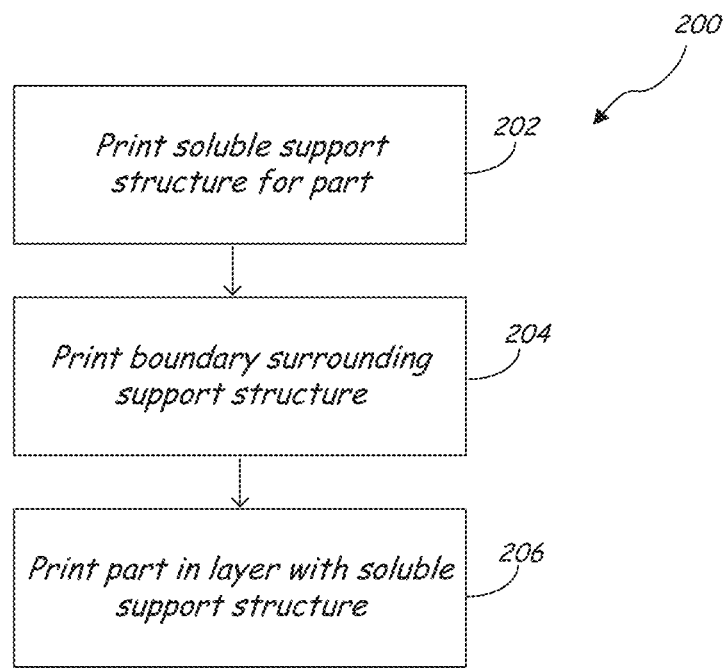
FIG. 2 is a flow chart diagram of a method according to an embodiment of the present disclosure.

In one embodiment, a method 200 of printing a part in an additive manufacturing system and reducing the deformation of the support material 80 during transfusion is shown in the flow chart diagram of FIG. 2. Method 200 comprises printing a support structure for the part in block 202, printing a boundary surrounding the support structure in block 204, and printing the part on the support structure in block 206. The part material, the support material, and the boundary material form a completed layer for transfusion to a previously deposited layer. It should be understood that in some embodiments, the order of printing is different, and that in some embodiments, as described herein, the layers of part, boundary, and support structure are transferred to a transfer medium, and are then transfused to a previously-printed layer together. Further, in one embodiment, the boundary and the part are printed simultaneously.

The boundary is printed with a material that is of sufficient strength to resist deformation of the support structure during printing of a layer of the part onto an existing layer. In one embodiment, the boundary is printed using part material. In another embodiment, the boundary is printed using a combination of part material and support material. In another embodiment, the boundary is printed using a third material that has sufficient strength to resist deformation of the support structure during printing. Printing the boundary with part material can increase throughput.

Further, a probe or other measuring device, such as an optical measurement device, a physical measuring device, or the like, may be used in another embodiment to measure a top of the boundary, a top of the part, and/or a top of the support, in order to provide feedback, for example through a controller, to control part height, and to maintain part and support heights within a predetermined tolerance. Closed loop feedback is used in one embodiment to continuously monitor and adjust printing to maintain a desired tolerance between part and support heights.

Figure 3:
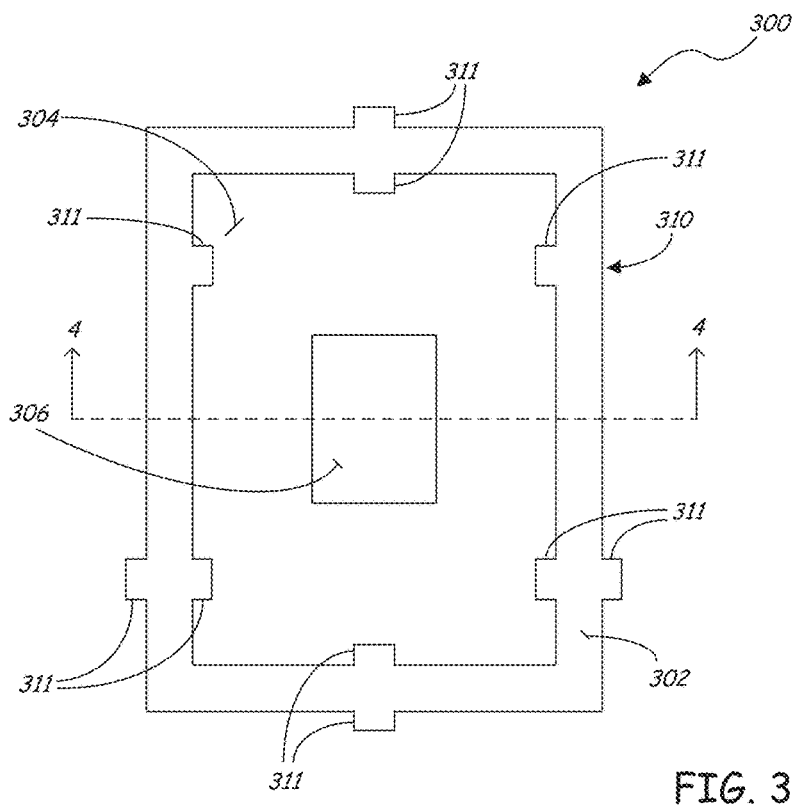
FIG. 3 is a top view of the part, support structure, and boundary shown in FIG. 3.
Figures 1, 4:
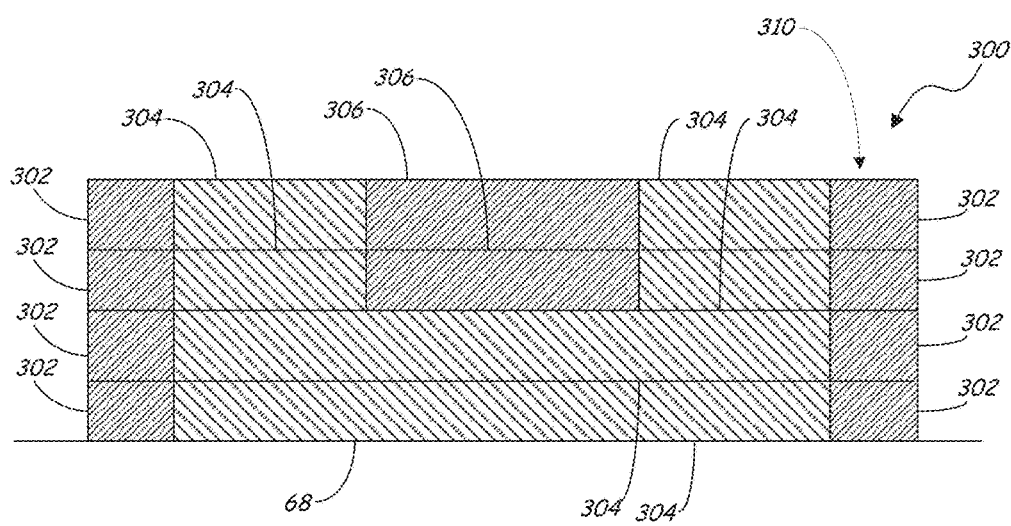
Figures 2, 4:
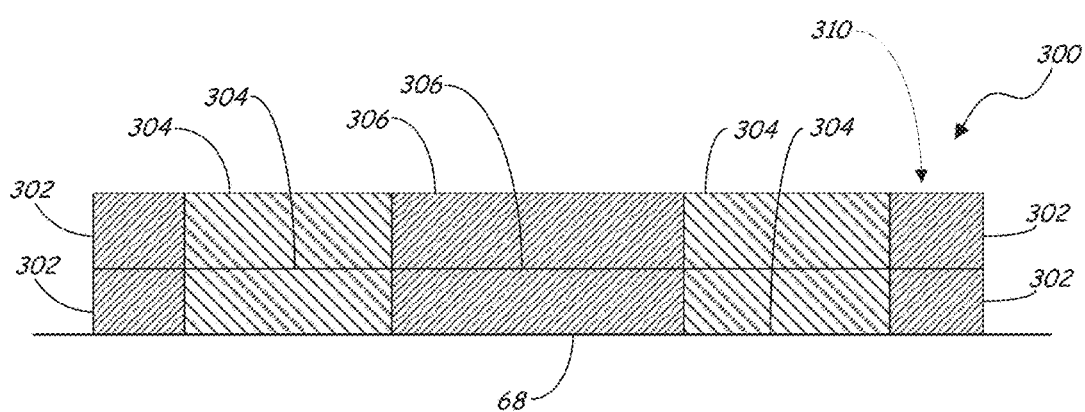
Figures 3, 4:
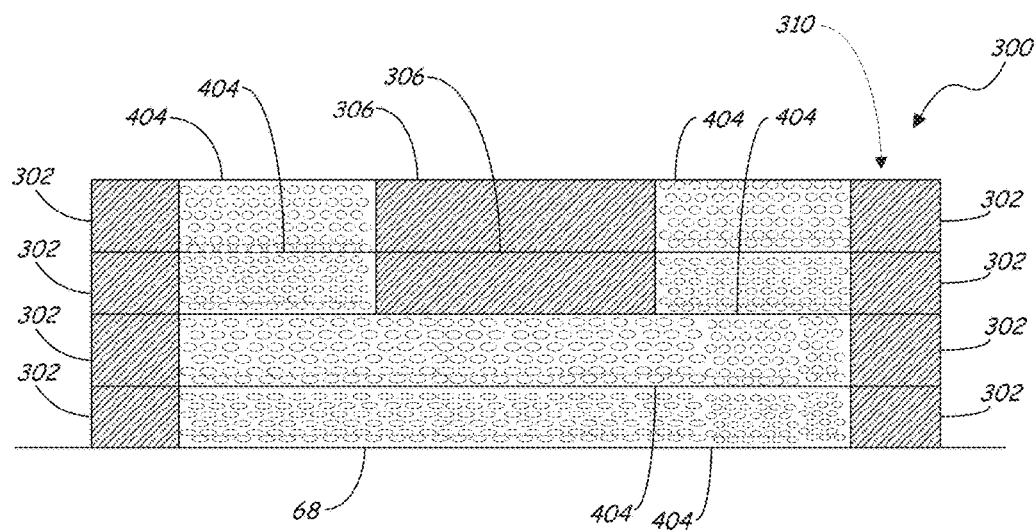
Figure 4:
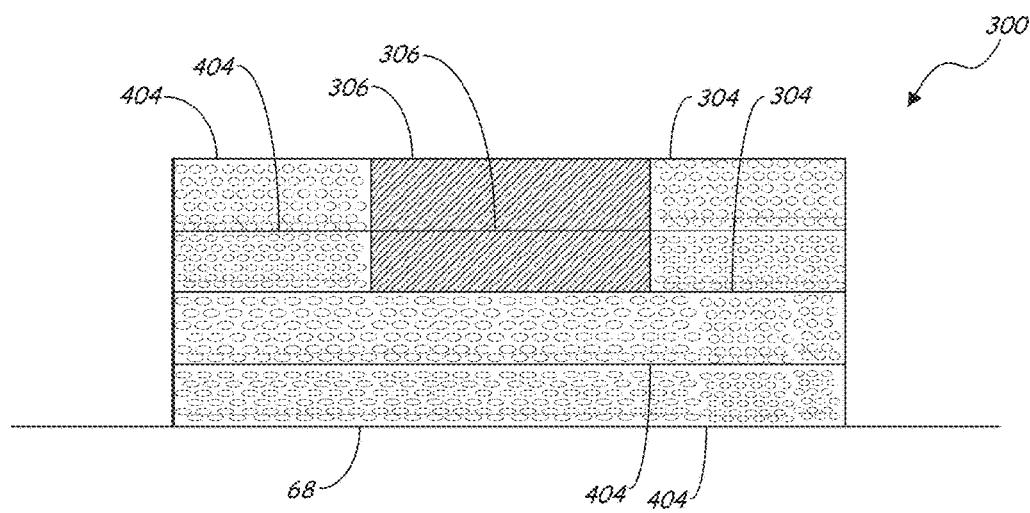

FIG. 3 is a top view of a boundary 310 of boundary material 302 surrounding support material 304 and part material 306. FIG. 4-1 is a cross-sectional view taken along section line 4-4 in FIG. 3 and illustrates a part, support structure, and boundary printed according to an embodiment of the present disclosure. Platform 68 supports layers of boundary material 302, layers of support material 304, and layers of part material 306. The boundary material 302 forms a boundary 310 that surrounds the support material 304.

Figures 4, 5:
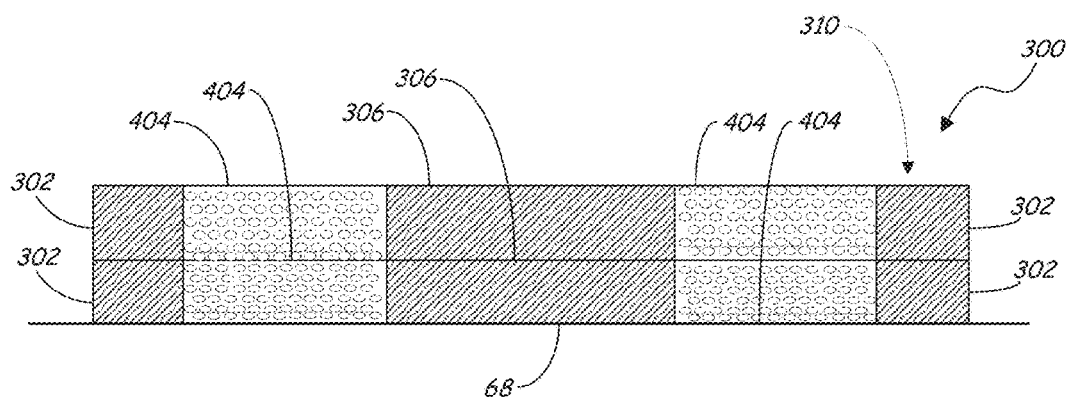
Figures 4, 5, 6:
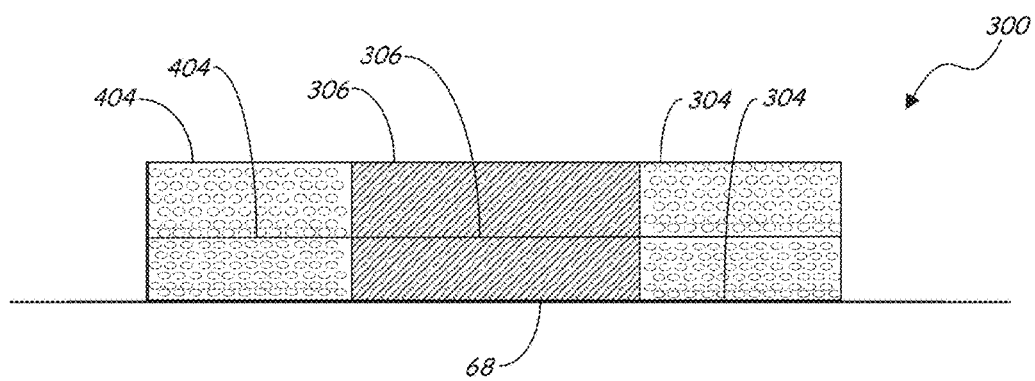
Figure 5:
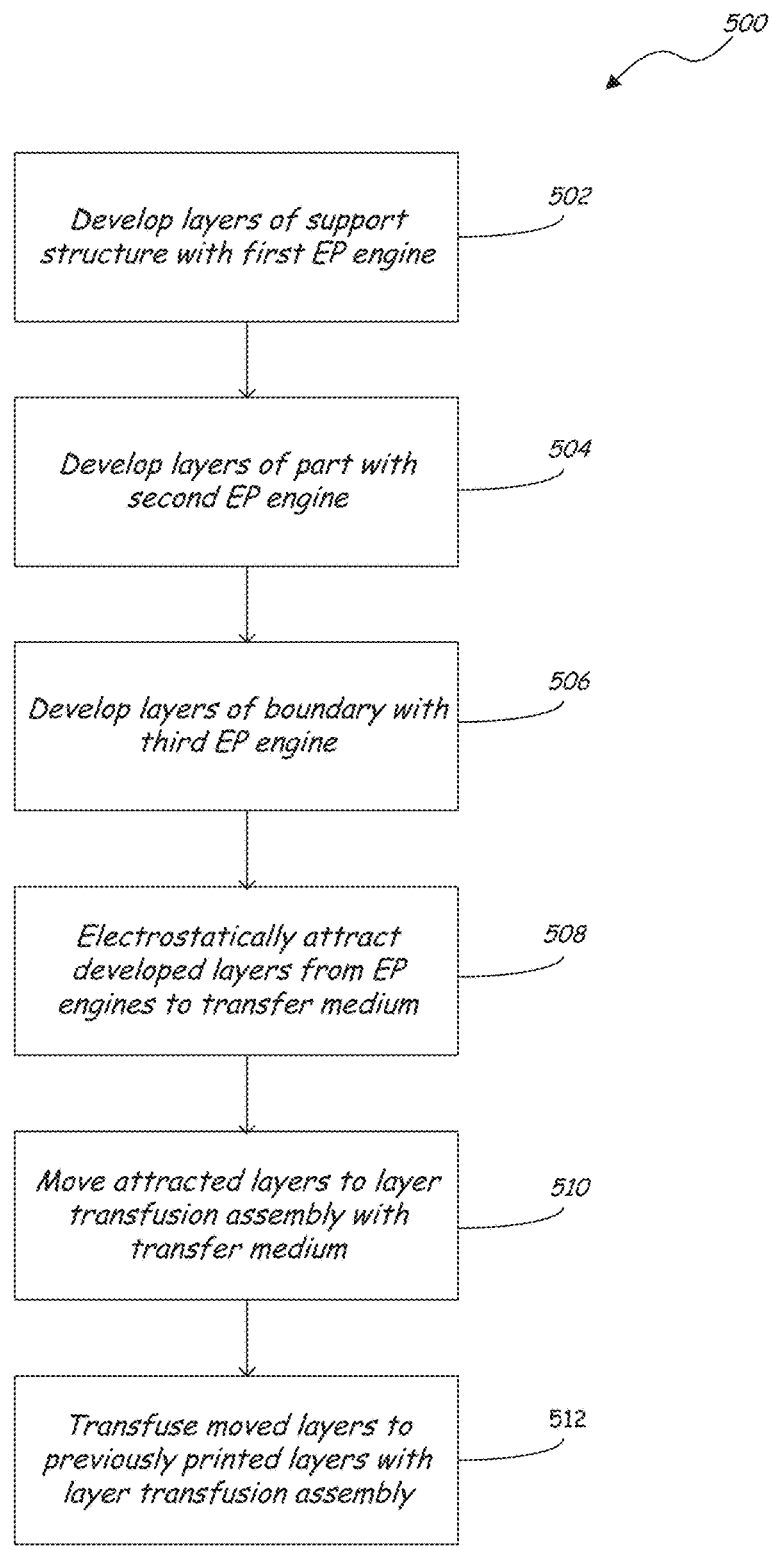
Figure 6:
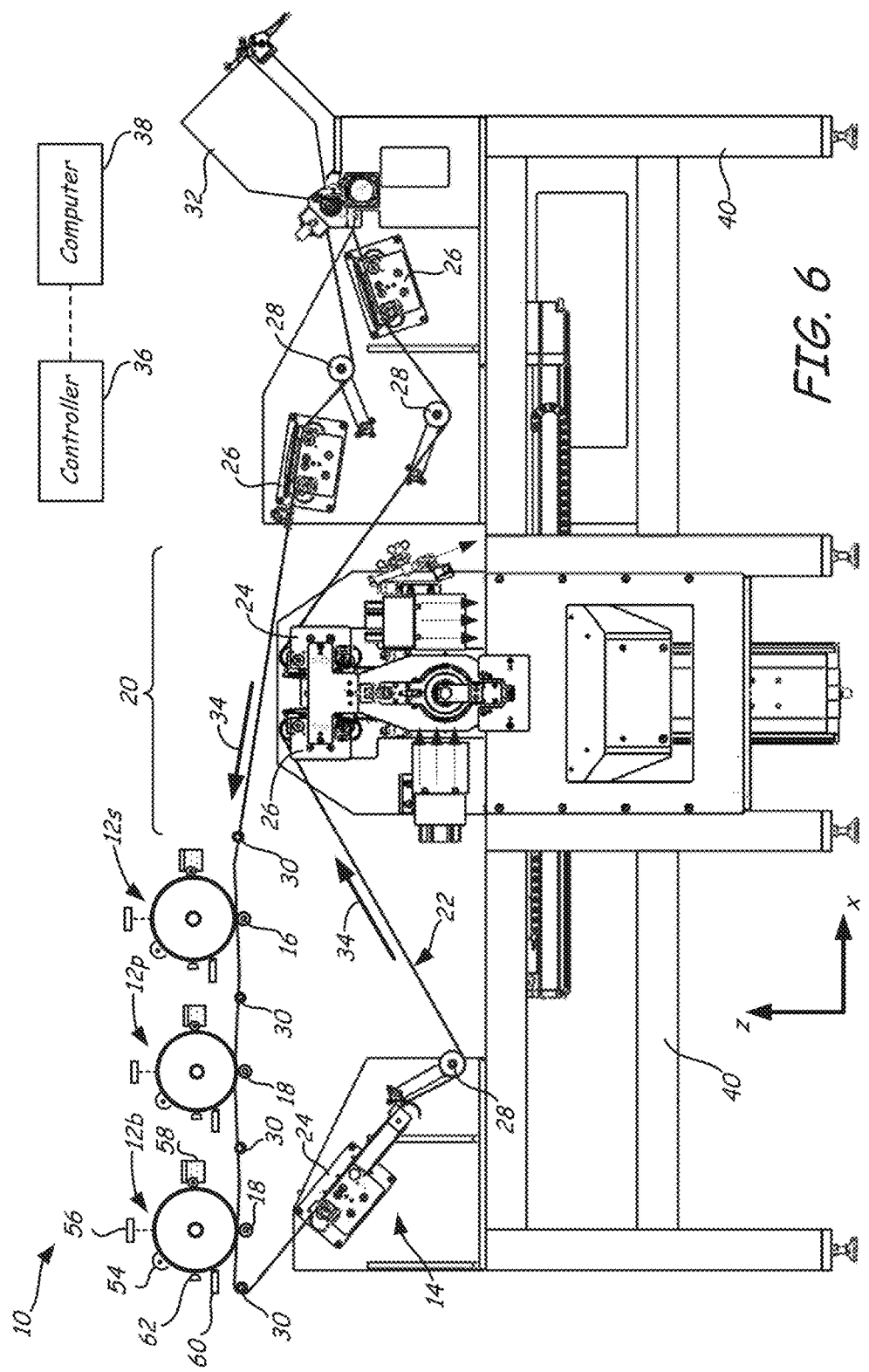
Figure 7:
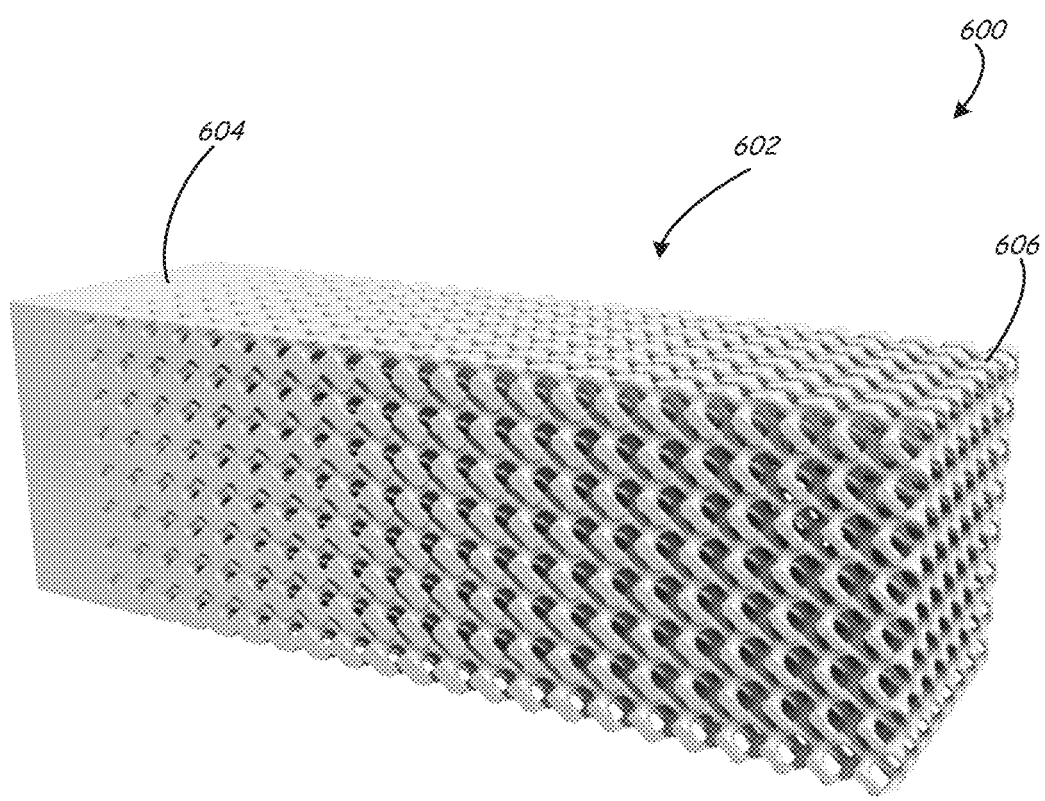
FIG. 7 is a diagrammatic perspective view of an example of a variable density lattice support structure which can be modulated to vary from being completely solid to a decreasing density.

The printing of the part 306, the boundary 302, and the support structure 304 is in one embodiment performed using an electrophotography-based additive manufacturing system such as that shown in FIG. 6 and described in Batchelder et al., U.S. Publication No. 2017/0173874, which published on Jun. 22, 2017, and is incorporated by reference herein in its entirety. Printing in one embodiment comprises developing layers of the support structure, the boundary, and the part from charged material with support, boundary, and part electrophotography engines. The part material, the support material, and the boundary material are electrostatically attracted to develop a layer from the electrophotography engines to a transfer medium. The attracted layers are moved to a layer transfusion assembly with a transfer medium. The moved layers are then transfused to previously-printed layers of the support structure, boundary, and part with the layer transfusion assembly. The support structure, boundary, and part are in one embodiment printed with separate electrophotography-based engines. In another embodiment, printing of the support structure is performed using a first electrophotography-based engine and printing of the part and boundary are performed using a second electrophotography-based engine, wherein the part and boundary material are the same material.

In another embodiment, more than one layer is printed at a time, as follows. Part material and boundary material for layer i–1 are printed with a first EP engine, then support material for layer i–1 is printed with a second EP engine. Following that, part material and boundary material for layer i are printed with the first EP engine, and support material for layer i is printed with the second EP engine. When this pattern of multiple layers is transfused to the part, the layer i is on the top. In this embodiment, two layers are transferred to the belt for printing instead of one. That is, layer i–1 is a layer that is printed onto the existing part, and layer i is printed onto layer i–1, allowing the printing of two layers in rapid succession.

In another embodiment, the boundary such as boundary 310 may include one or more buttresses 311 formed at or with an interior or exterior surface of the boundary 310, to support or reinforce the boundary against lateral displacement. In one embodiment, the buttresses 311 are formed at or with the interior surface of the boundary 310 to maintain a maximum size of the layer. However, depending upon the size and configuration of the part 306 being printed, one or more buttresses 311 extending from the interior surface of the boundary 310 could interfere with the printing of the part 306. In the event that a buttress 311 would interfere with the printing of the part 306, then the buttress 311 can be printed with the exterior surface of the boundary 310. It is also contemplated that buttresses 311 can be utilized solely along the interior of the boundary 310, solely along the exterior of the boundary 310 or a combination of buttresses 311 along the interior and exterior of the boundary 310 can be used depending upon the size and configuration of the part 306 being printed. The type of buttress is chosen in one embodiment depending upon the structure being supported, and include without limitation angled buttresses, clasping buttresses, diagonal buttresses, and setback buttresses.

In another embodiment, a boundary is provided of a near solid material, referred to here as a "solid material." This solid material may be a solid structure provided as the boundary, and may be provided without printing the boundary. In another embodiment, the boundary may be provided as partially part material and partially support material.

In other embodiments, layers of part 306 are printed directly on a build platform 68 instead of upon a layer of support material. This is shown for example in FIG. 4-2.

Referring now to FIG. 4-3, shown is a cross-sectional view taken along section line 4-4 in FIG. 3 similar to that shown in FIG. 4-1. In FIG. 4-3, however, support material 404 is used which has a porous structure in order to reduce the amount of support material required to print the part, and in order to make removal of the support material less time consuming in some embodiments. The layer illustrations are diagrammatic only. For example, it has been observed that in some situations, the support material top surface for a layer tends to sit at a height several layer thickness below the part material height for the layer due to the support deforming sideways or densifying.

The porous support material structures can be of a variety of configurations such as those discussed above with reference to FIGS. 10-18. For example, the porous support material structures can be formed with variable density lattices, such as gyroid lattices. Further, the variation in density can be controlled during the printing process such that the density of the support material decreases as a function of distance from the part. Also, as shown in FIG. 4-4, in some embodiments using porous support material 404, the boundary provided using boundary material 302 is not required and can be omitted when printing the layers as described. Further, as shown in FIGS. 4-5 and 4-6 which are similar to FIGS. 4-3 and 4-4, in some embodiments, part 306 is printed directly on a build platform 68 instead of upon a layer of support material.

Another method 500 for printing a part from part material, having a support structure of support material and a boundary of boundary material, with an electrophotography-based additive manufacturing system, is shown in FIG. 5. Method 500 comprises developing layers of the support structure from charged support material with a first electrophotography engine in block 502, developing layers of the part from charged part material with a second electrophotography engine in block 504, developing layers of the boundary from charged boundary material with a third electrophotography engine in block 506 to complete a developed layer. The developed layers from the electrophotography engines are electrostatically attracted to a transfer medium in block 508. The attracted layers are moved to a layer transfusion assembly with the transfer medium in block 510. The moved layers are transferred under pressure to previously-printed layers of the part, support structure, and boundary with the layer transfusion assembly in block 512. In one embodiment, the boundary is printed as a constraint against lateral expansion and vertical deformation of the support material during transfusion of the part, boundary, and support material onto a previously-printed layer.

Support material suitable for use with the embodiments of the present disclosure are disclosed and discussed in greater detail in commonly owned U.S. Pat. No. 9,029,058, the disclosure of which is incorporated by reference to the extent that it does not conflict with the present disclosure.

The support material functions as sacrificial material for the part material, and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part. Further, support structures can function as a build surface for the 3D part, as a release layer between the 3D part and the platen, and a separator between bearing surfaces of a 3D part that has internal moving portions once printed. Once the 3D part has been printed, the support structure of the sacrificial support material may be removed to reveal the completed 3D part, preferably without damaging any of the critical or delicate geometrical features of the 3D part.

These requirements, however, have imparted significant challenges in producing a support material that is suitable for use in an electrophotography-based additive manufacturing system. For example, as discussed below, each layer of the support material is preferably transfused along with an associated layer of the part material. As such, the support material is selected in one embodiment to be compatible with the properties and rheology of its associated part material, such as, for example, thermal properties, elasticity, and melt rheology.

Moreover, the support material is preferably capable of accepting and maintaining a stable triboelectric charge that is similar to, or more preferably, substantially the same as that of the associated part material to allow the part, support, and boundary materials to be transferred to the layer transfusion assembly together. Furthermore, the support material is preferably capable of being produced in a powder-form using a cost-efficient processing and recycling technique, preferably exhibits good adhesion to the part material, and is preferably thermally stable during a layer transfusion process.

Accordingly, the support material of the present disclosure has been developed to balance these competing factors. Briefly, the support material compositionally includes a thermoplastic copolymer, a charge control agent, and optionally, a heat absorber and/or one or more additional materials, such as a flow control agent. In an exemplary support material composition, the thermoplastic copolymer includes aromatic groups, (meth)acrylate-based ester groups, carboxylic acid groups, and anhydride groups, where a ratio of the anhydride groups-to-carboxylic acid groups is preferably maximized or otherwise increased in favor of anhydride conversion for the copolymer, such as those found in copending and commonly owned U. S. Patent Publication No. 2015/0024309, which is incorporated in its entirety herein by reference.

An electrophotography-based additive manufacturing system for printing a three-dimensional part according to an embodiment of the present disclosure comprises a transfer medium configured to receive and transfer imaged layers of a thermoplastic-based powder for a boundary, a thermoplastic-based powder for a support, and a thermoplastic-based powder for the part from at least two imaging engines; a heater configured to heat the imaged layers on the transfer medium; and a layer transfusion assembly comprising a build platform, the layer transfusion assembly being configured to transfuse the heated layers in a layer-by-layer manner onto the build platform to print the three-dimensional part. The at least two imaging engines comprise in one embodiment a first imaging engine configured to print layers of part material and boundary material, wherein the part material and boundary material are the same, and a second imaging engine configured to print layers of support material different than the part and boundary material. In another embodiment, a separate imaging engine is used for each of the boundary, support, and part, using different materials for each.

FIG. 6 illustrates system 10, which is an exemplary electrophotography-based additive manufacturing system for printing 3D parts from a part material (e.g., an ABS part material), and associated support structures from the support material of the present disclosure. As shown in FIG. 6, system 10 includes a trio of EP engines 12$p$, 12$s$, and 12$b$, belt transfer assembly 14, biasing mechanisms 16 and 18, and layer transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

EP engines 12$p$, 12$s$, and 12$b$ are imaging engines for respectively imaging or otherwise developing layers of the part, support materials, and boundary, where the part, support, and boundary materials are each preferably engineered for use with the particular architecture of EP engine 12$p$, 12$s$, or 12$b$. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as system frame 40. Additionally, the components of system 10 are preferably retained within an enclosable housing (not shown) that prevents ambient light from being transmitted to the components of system 10 during operation.

FIG. 6 illustrates EP engines 12$p$, 12$s$, and 12$b$, where EP engine 12$s$ (i.e., the upstream EP engine relative to the rotational direction of belt 22) develops layers of the support material (e.g., layers of porous support material as described below), EP engine 12$p$ (i.e., the midstream EP engine relative to the rotational direction of belt 22) develops layers of the part material, and EP engine 12$b$ (i.e., the downstream EP engine relative to the rotational direction of belt 22) develops layers of the boundary material. In alternative embodiments, the arrangement of EP engines 12$p$, 12$s$, and 12$b$ may be varied such that the EP engines are in a different order relative to the rotational direction of belt 22. In further alternative embodiments, system 10 may include four or more EP engines for printing layers of additional materials. In one embodiment, the third EP engine 12$b$ is used to deposit a layer of a boundary that is placed external to the part and support material, so as to surround the support material. The boundary (e.g., boundary 310) is constructed in one embodiment from a boundary material that serves to support the part and provide back pressure against support material movement during the transfusion process. In some embodiments, where part material is used for the boundary 310, only two EP engines 12$p$ and 12$s$ are required. In other embodiments, no boundary 310 is utilized.

As further shown, EP engines 12$p$, 12$s$, and 12$b$ also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly.

In the shown example, the image-forming assembly for EP engine 12s is used to form layers of the support material, where the layers of support material are formed with one or more porous structures to decrease the amount of support material used, and/or to render removal of the support material easier and to allow the time for removal to be reduced. Similarly, the image-forming assembly for EP engine 12p is used to form layers of the part material, and in embodiments using a boundary, the image-forming assembly for EP engine 12b is used to form layers of the boundary material.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46. The imager 56 receives sliced layers of a 3D model, along with a porous lattice structure, as disclosed in commonly owned U.S. Ser. No. 15/517,436 filed Apr. 6, 2017 entitled "GPU MATERIAL ASSIGNMENT FOR 3D PRINTING USING 3D DISTANCE FIELDS", which is herein incorporated by reference in its entirety.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

An electrostatically printed three-dimensional block part comprises in one embodiment a printed part, a removable support surrounding the printed part, and a boundary surrounding the removable support, the boundary having a strength greater than the support. The part and the support material are undeformed after pressure transfusion in a three-dimensional printing process. In one embodiment, the boundary constrains the support against lateral expansion during transfusion of layers of the part and support. However, in other embodiments, the boundary does not provide such a constraining function, but instead provides a sacrificial edge which protects the part from over-heating. In another embodiment, the boundary further comprises a buttress to further constrain the support against lateral expansion.

After a printing operation is completed, the resulting 3D part, support structure, and any boundary may be removed from system 10 and undergo one or more post-printing operations. For example, the support structure and boundary may be sacrificially removed from the 3D part, such as by using an aqueous-based solution (e.g., an aqueous alkali solution). Under this technique, the support structure may at least partially dissolve in the solution, separating it from the 3D part and boundary in a hands-free manner.

In comparison, part materials such as an ABS part material are chemically resistant to aqueous alkali solutions. This allows the use of an aqueous alkali solution to be employed for removing the sacrificial support structure without degrading the shape or quality of 3D part. Examples of suitable systems and techniques for removing support structures in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Alternatively, in some embodiments, prior to removal of the sacrificial support structure, post processing of parts includes in one embodiment chucking (e.g., restraining) the part and build sheet, for example with a magnetic chuck, and subsequently machining the boundary from the vertical walls of the support material prior to dissolution thereof.

Furthermore, after the support structure 82 is removed, the 3D part may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

Collectively (prior to removal of the support structure), the 3D part printed from the ABS part material and the support structure printed from the support material of the present disclosure may be provided as an "object" where the 3D part and support structure are adhered to each other. Prior to removal of the support structure from the 3D part, the support structure may support overhanging features of the 3D part, significant angular slopes exist in the 3D part, areas where it is essential to also preserve delicate features in the 3D part, such as small orifices or controlled pore structures, and in some situations, to laterally encase the 3D part.

As discussed above, in an electrophotographic printing process, the support material (e.g. 82, 304, 404 discussed above) adds significant cost to the process of printing a 3D part, and can also add processing time during removal of the support structure. For example, support materials can, in some embodiments be dissolved. In exemplary embodiments, the support structure is formed to be rigid, but porous, to reduce the support material required, and to allow the support material to be removed (e.g. by dissolving) more quickly. In exemplary embodiments described below, the porous structure of the support material is formed to be an interconnected lattice structure which both increases the surface area of the support material which can be exposed to the dissolving solution, and also allows for flow of the dissolving solution in multiple directions. In some conventional support removal processes, apertures were formed in the support material, with the apertures extending vertically through the support material. This allowed for flow of the dissolving solution primarily in only one direction. It has been found that a porous support structure formed using an interconnected lattice structure allows flow of the dissolving solution in other directions, including in a direction aligned parallel with the print plane. This allows the support removal process to be completed in considerably less time.

Figure 10:
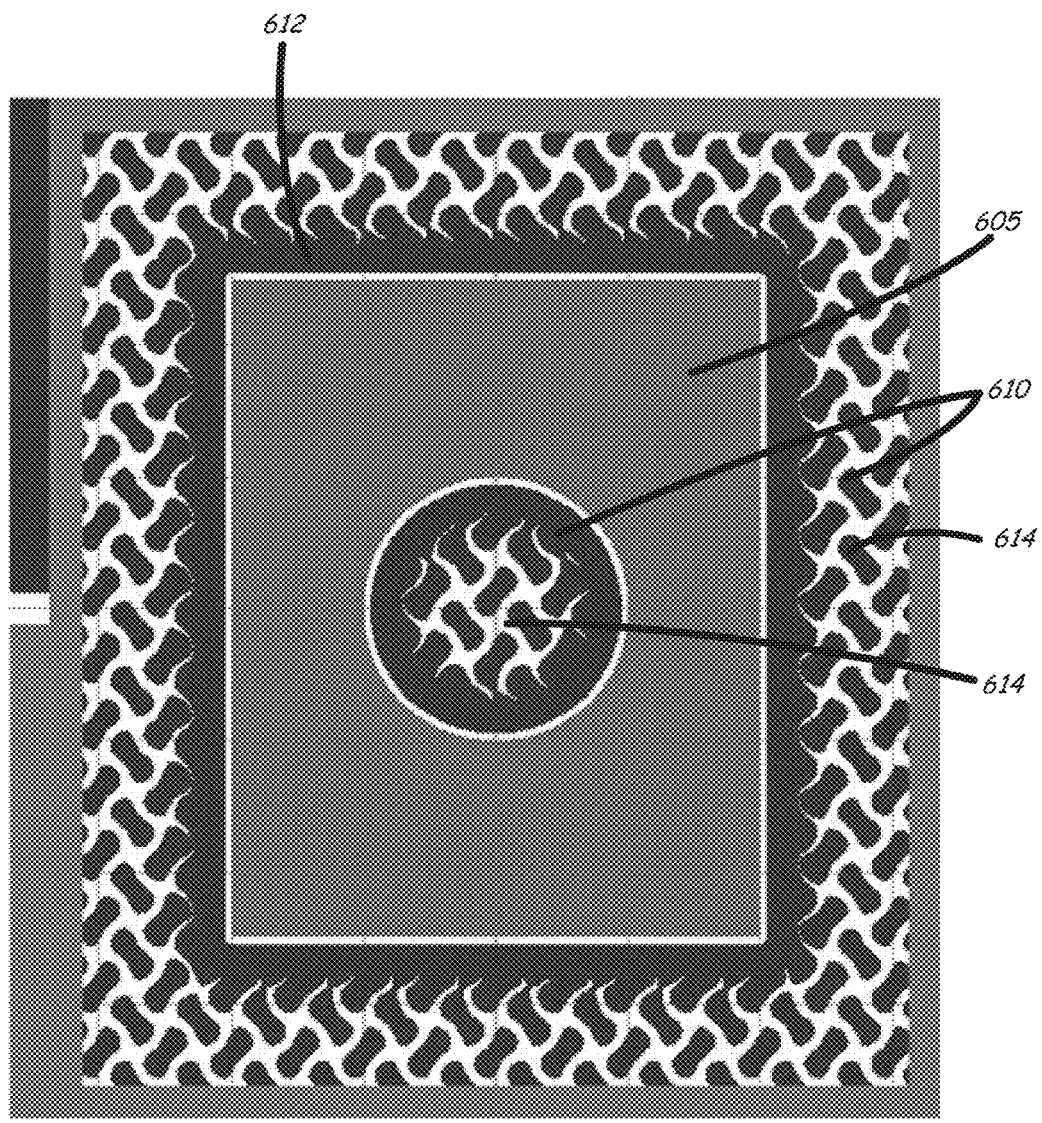
FIG. 10 is a diagrammatic top view of a printed part and porous support structure, with an inner part block wall surrounding the part.

In exemplary embodiments, variable density lattices are used to form the supports. FIG. 10 illustrates a portion of a support 600 formed with a variable density lattice 602. The lattice 602 can, in exemplary embodiments such as the one illustrated in FIG. 10, be modulated to vary from being nearly or completely solid in a first region 604 proximate the part being printed, to having much lower density in a region 606 further from the part.

The variable density lattices can be made from an implicit lattice, such as isosurfaces of periodic spatial functions. These functions take the form f(p)−c=0, where p is a 3D point and c modulates the density of the lattice. Examples include f(p)=sin(x) cos(y)+sin(y) cos (z)+sin(z) cos(x), (which approximates a gyroid minimal surface), f(p)=cos (x)+cos(y)+cos(z) (which approximates the Schwartz minimal surface, and several others).

Modulating the lattice allows the variation of density, for example between being completely solid to vanishing, as a function of a number of parameters, including the distance from the part, the required stiffness in the support structure, and the required porosity. Generally, a variety of different variable density lattice structures can be used as will be described below with reference to FIGS. 8-15. These lattices tend to be gyroid lattices such as illustrated in FIG. 10, or the lattices can be other types of structures. While in exemplary embodiments variable density lattices are used, in other embodiments porous support structures formed from lattices or other structures having a substantially constant density can be used as well. In the various porous support structure embodiments discussed, the support material substantially encapsulates the part. This can, for example, help prevent the part material from spreading undesirably. The support material can have portions closest to the part formed to be substantially solid, with portions more distant from the part being porous and/or having variable density. As will be discussed, an air gap can be formed to surround the part to prevent mixing of the part material and the support material. However, this is not required in all embodiments. Further, an inner part block wall can be formed around the part in some embodiments, from the support material, though this need not be the case in all embodiments. Further, in some embodiments, part material features can be buried in the support material to further improve the mechanical properties of the support. The part and support can be co-printed in some areas where it is desirable to have the support dissolve less quickly (e.g., because it is providing pathways to carry solvent to areas of the part block which are more difficult to reach).

Figure 8:
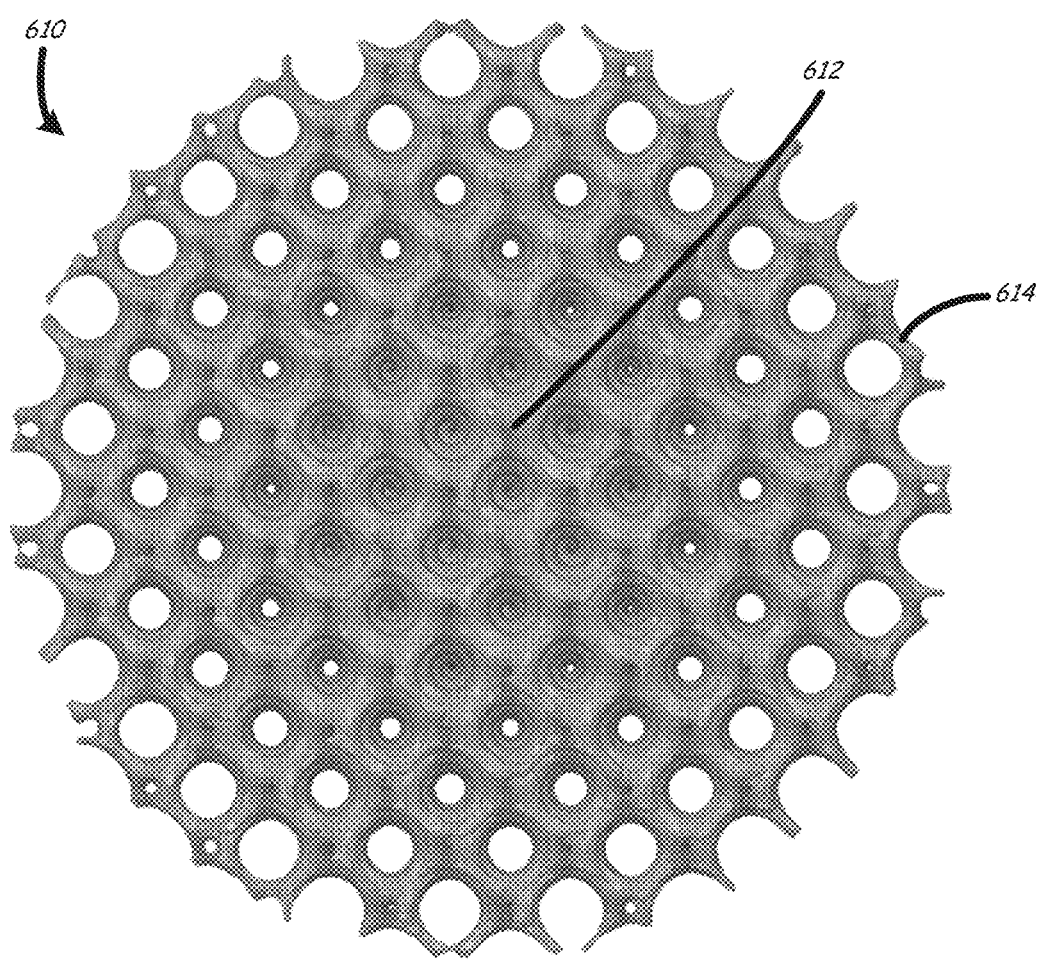
FIG. 8 is a diagrammatic top view of another support structure formed with a gyroid lattice structure which decreases in density as a distance from the part increases.

Referring now to FIG. 8, shown is a portion of another support structure 610, which is another example of a gyroid lattice. Thin-walled gyroid structures have the greatest known stiffnesses per density of the crystallographic lattice groups, which allows less material to be used in the support structure while allowing stiffness and strength to be maintained. The support structure 610 varies in density or porosity from a region 612 which would support or be proximate to the part and therefore would have the highest density (e.g. can be solid), to less dense regions 614 which are increasingly distant from the part.

Figure 9:
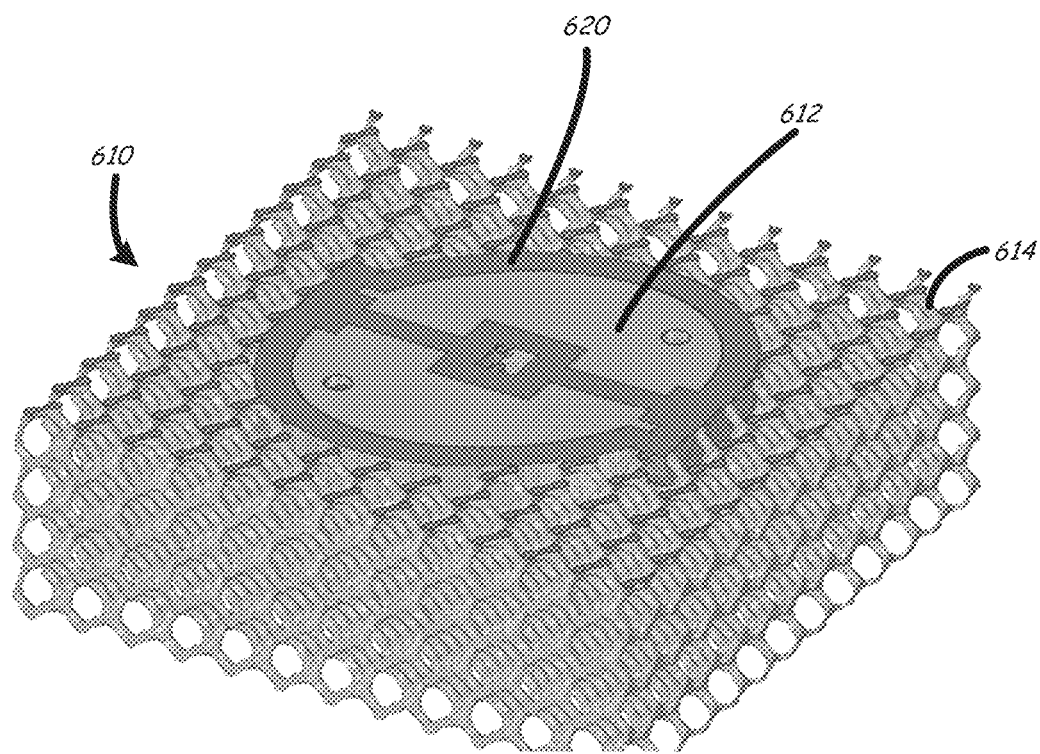
FIG. 9 is a diagrammatic perspective view of the support structure shown in FIG. 16-1 surrounding a part.

While the porous support structures can vary in density as a function of distance from the part, this need not be the case in all embodiments. Instead, the support structure can vary in density in particular regions, but maintain a substantially constant density throughout a region. For example, FIG. 9 illustrates the gyroid support structure 610 with substantially solid portions 612 in close proximity to part 620, while more distal portions 614 of support structure 610 are more porous (e.g., have less density) in comparison to portions 612. In this particular example, solid regions 612 are positioned between portions of part 620, but can also be positioned adjacent but outside of the part 620 or elsewhere. Again, this allows for the use of less support material while still maintaining the stiffness required to support part 620. It also improves the support material removal process by allowing dissolving solution to flow in multiple directions, including directions aligned with the print plane, through the lattice structure 610.

As noted, the disclosed porous support structure concepts can be implemented using a variety of different methods, techniques and structures. For example, referring to FIG. 10, a part 605 can be printed with a support structure 610 that includes an inner block wall 612, and a porous lattice 614. The inner part block wall 612 encapsulates part 605 during the build. The porous lattice structure 614 can have a substantially constant density, or a variable density as described.

Figure 11:
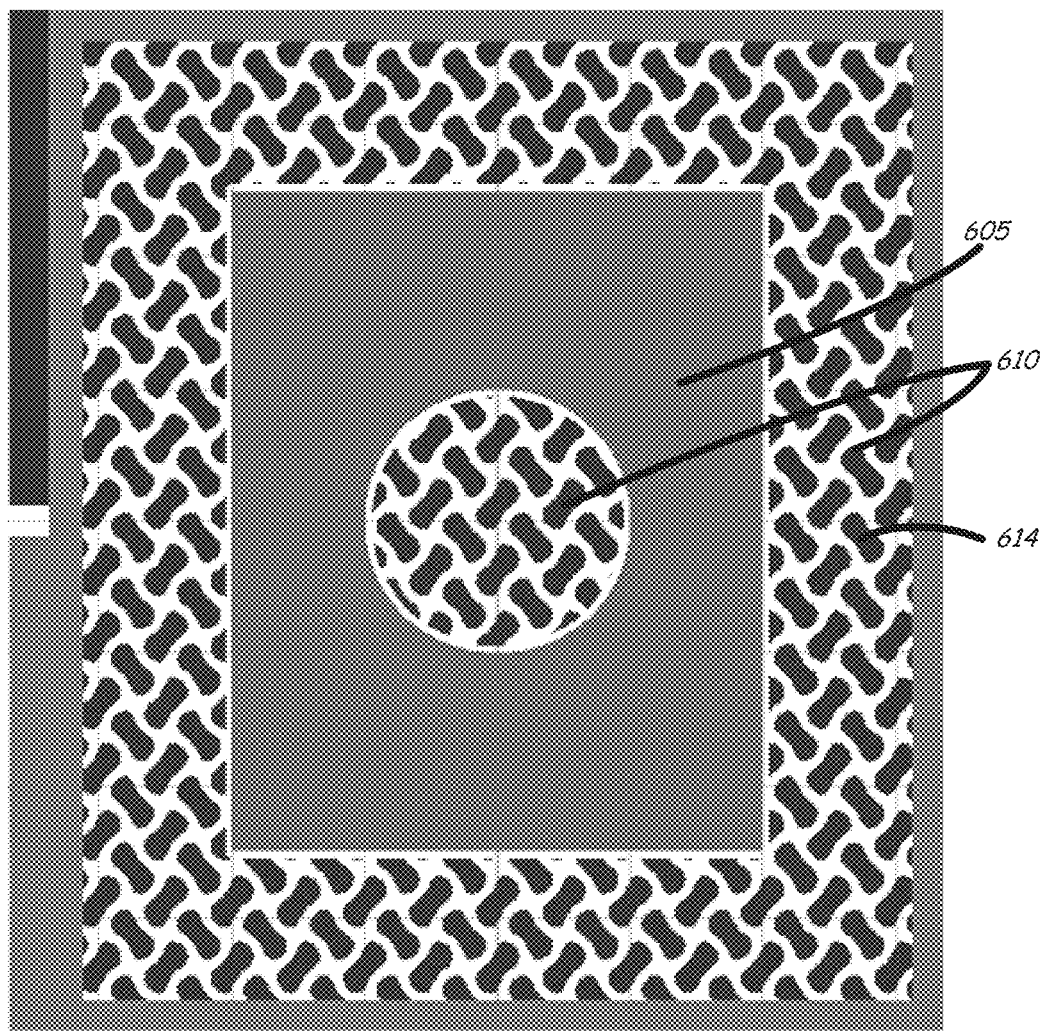
FIG. 11 is a diagrammatic top view of a printed part and porous support structure, without an inner part block wall.

While an inner block wall 612 can be included in some support structures, it is not required in all embodiments. For example, FIG. 11 illustrates part 605 and support structure 610 having a porous lattice structure 614, without such an inner part block wall.

Figure 12:
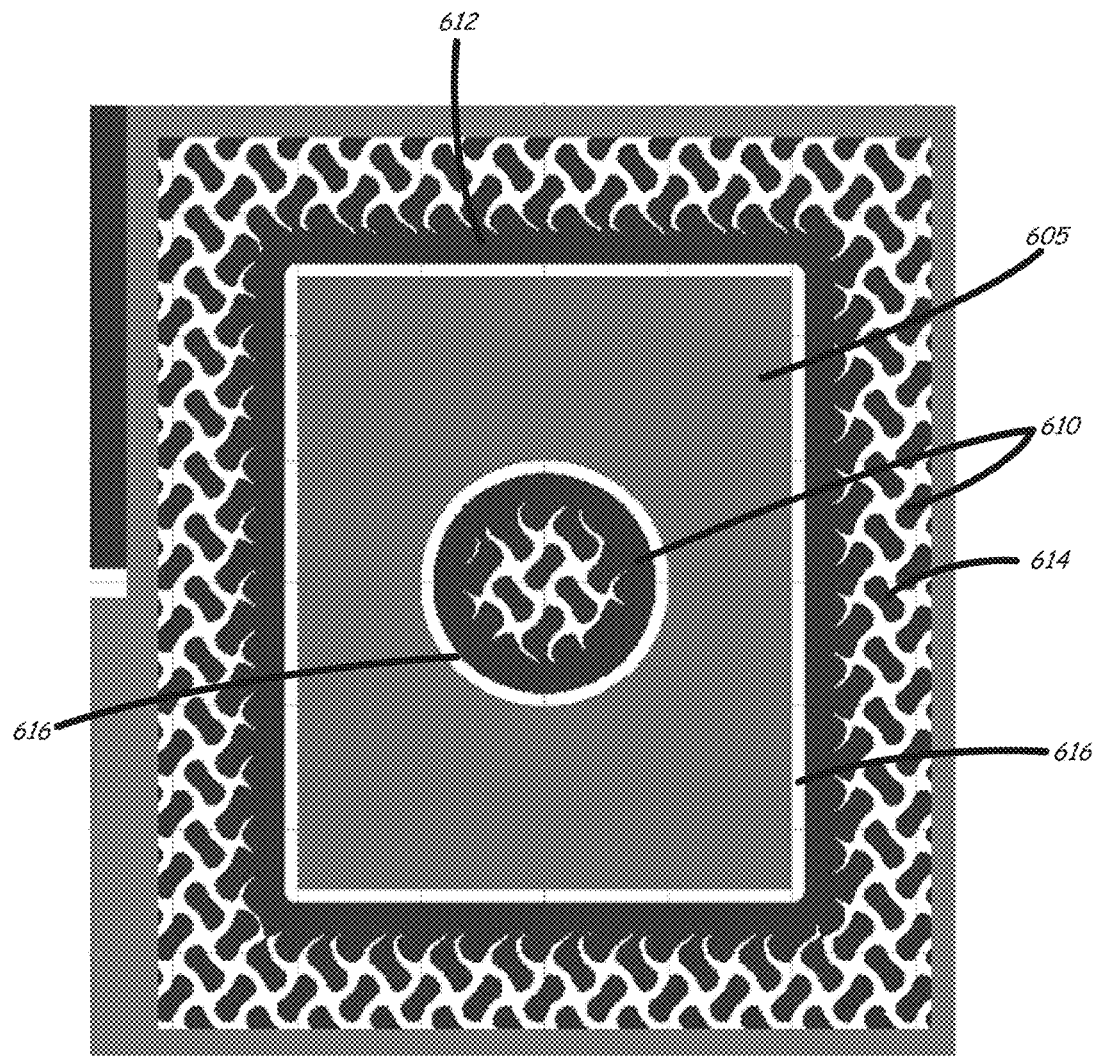
FIG. 12 is a diagrammatic top view of a printed part and support structure with gaps formed between the part and support structure and/or between the part and inner part block wall.
Figure 13:
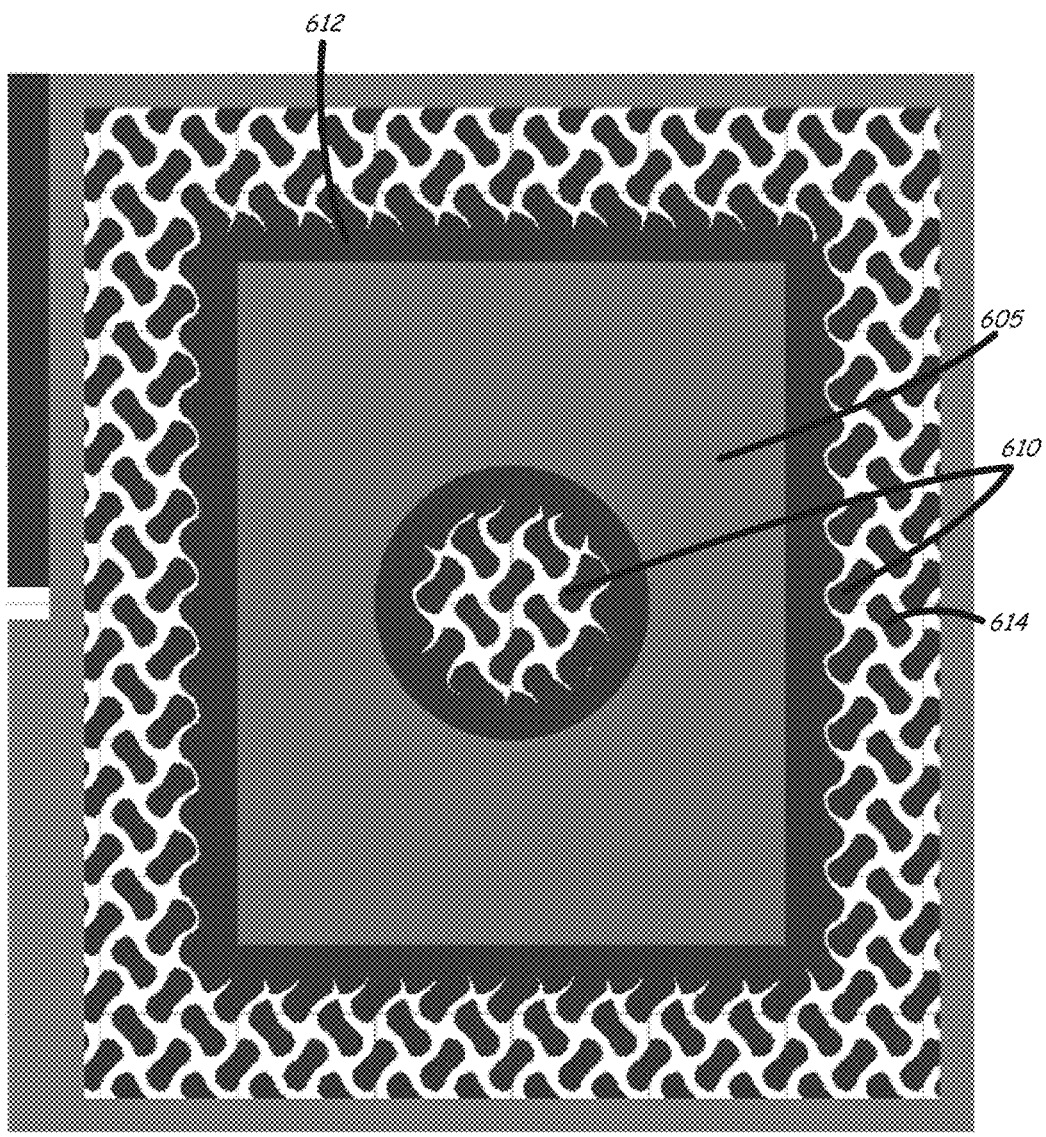
FIG. 13 is a diagrammatic top view of a printed part and porous support structure without an inner part block wall and without gaps between the part layer and support structure.
Figure 14:
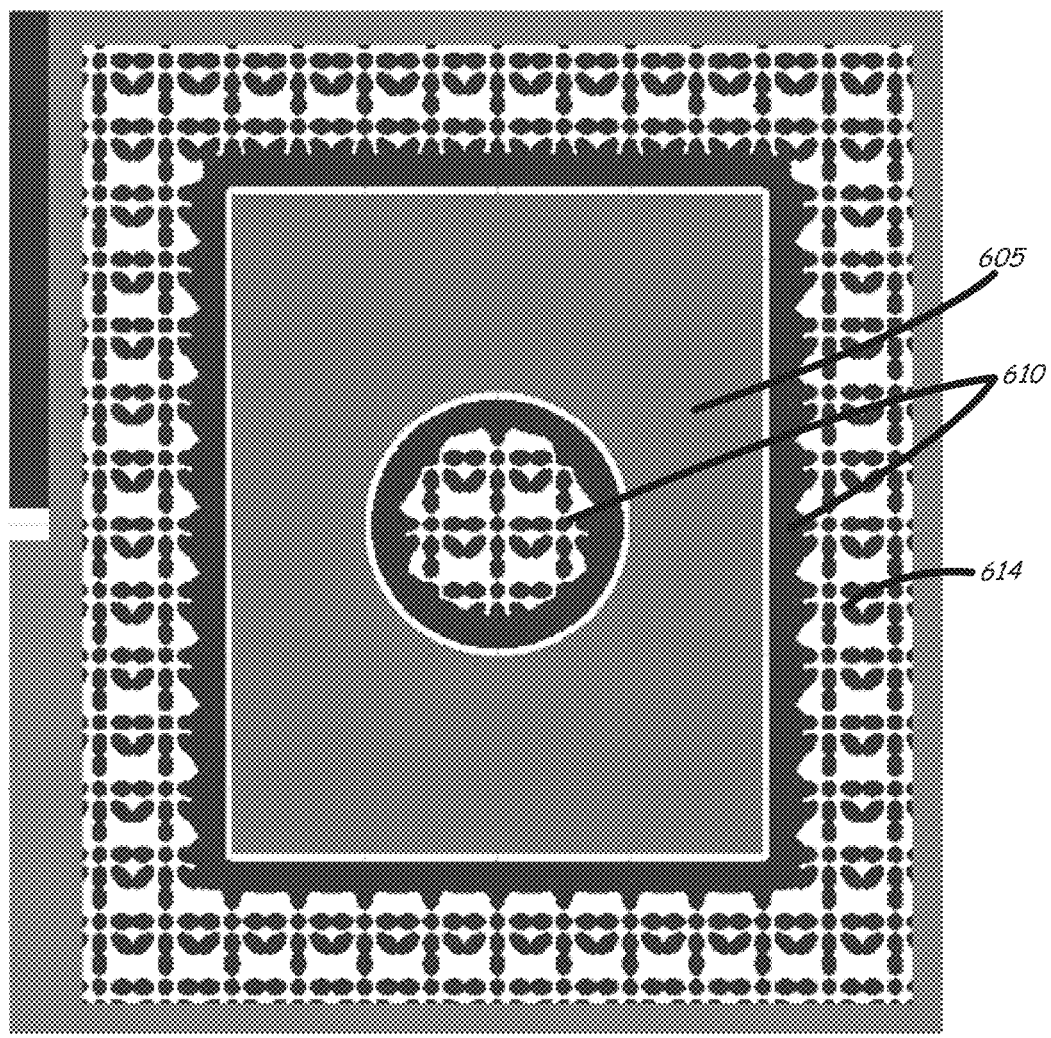
FIG. 14 is a diagrammatic top view of a printed part and porous support structure with the porous support structure being formed with a variable density lattice.

Referring now to FIG. 12, in some embodiments, the porous support structure 610 can be formed between the support material and the part material of part 605. The gaps 616 provide for improved registration or alignment. However, gaps 616 are not required in all embodiments. For example, FIG. 13 illustrates part 605 and support structure 610 with no inner part block wall and with no gaps between part material and support material.

Figure 15:
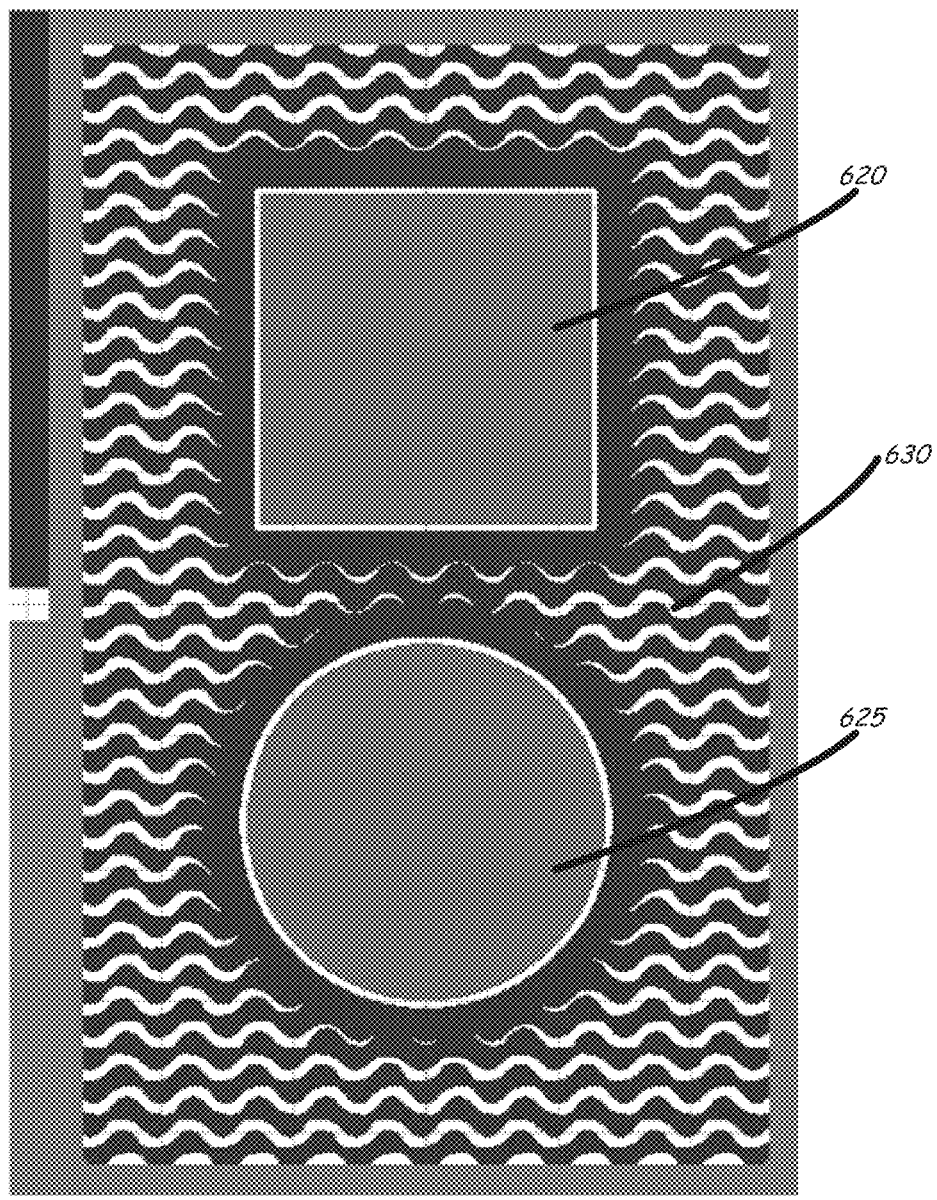
FIG. 15 is a diagrammatic top view of two printed parts and a corresponding porous support structure.

As noted, a variety of different lattice structures can be used for support structure 610. For example, in FIG. 14, a variable density support structure 614 is shown. The variable density structure can vary consistently throughout the support layers, or can vary as a function of distance from the part. Further, disclosed porous support structure concepts and embodiments can be used to print multiple parts simultaneously. For example, FIG. 15 illustrates parts 620 and 625, with porous support structure 630 having varying porosity and/or forming pathways for aqueous-based solutions to more efficiently dissolve the support material.

Figure 16:
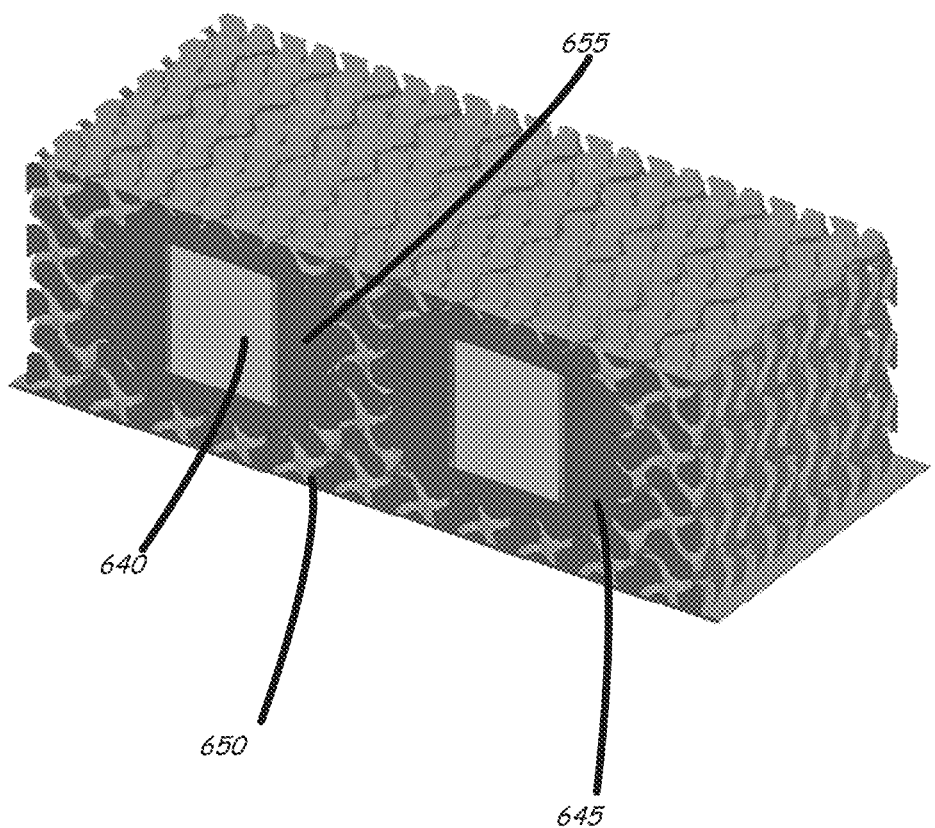
FIG. 16 is a diagrammatic perspective view of two printed parts with flowable channels formed in porous support material.

Referring now to FIG. 16, shown is a pair of parts 640 encapsulated in support material 645 having a porous structure that forms flow paths 650 for use in removal of the support material using an aqueous solution. Also, as shown in FIG. 16, thickness of solid portions of the support material surrounding each part varies for different portions of the part.

Figure 17:
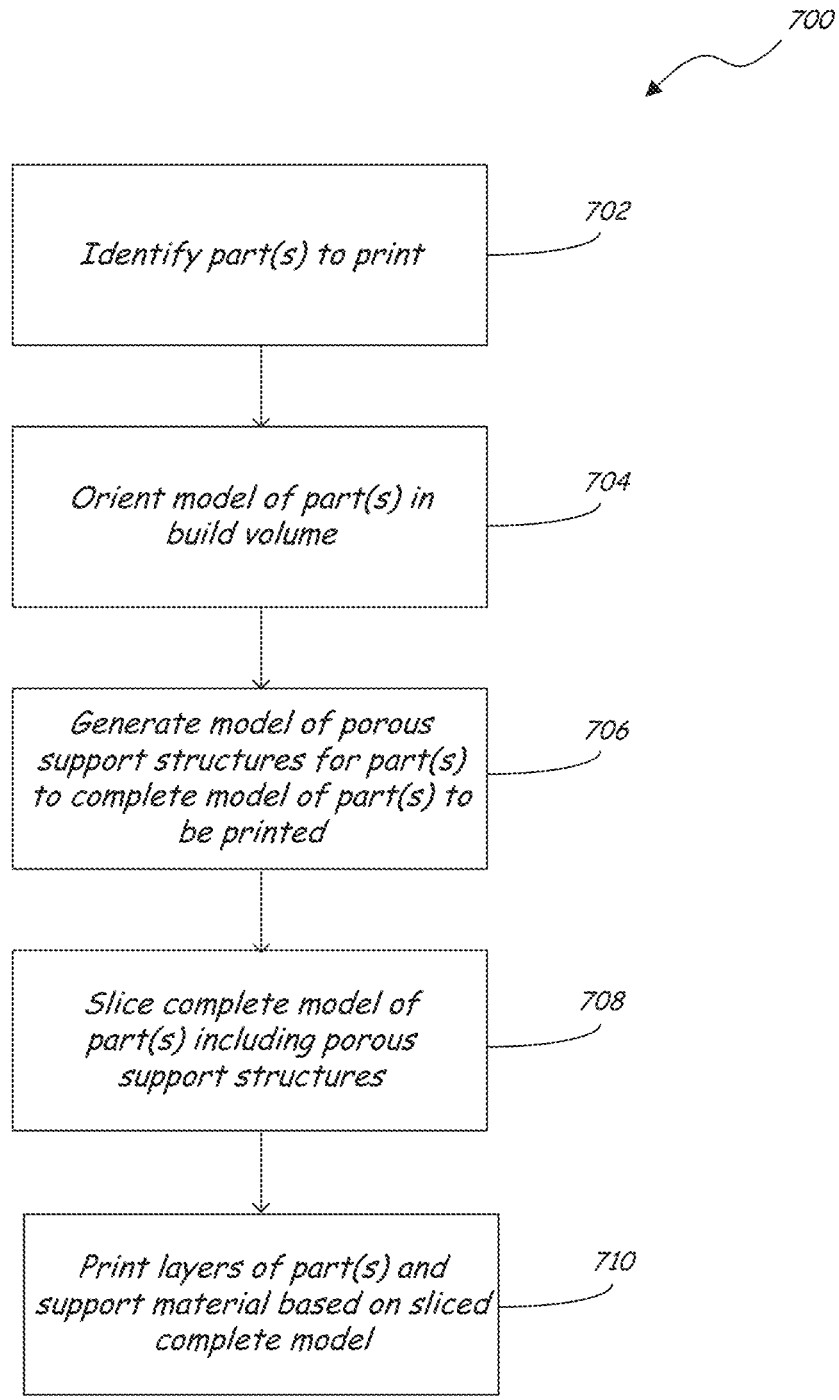
FIG. 17 is a flow chart diagram of a method according to another embodiment of the present disclosure.

Referring now to FIG. 17, shown is another method embodiment of printing a part using an electrophotography-based additive manufacturing system. As shown at steps 702 and 704, the method 700 includes identifying a part or parts to print and orienting a model of the part(s) in the build volume. Next, at step 706, a digital representation of porous support structures for the part(s) is generated to form a digital representation of a part block of the part(s) to be printed. Any of the above-disclosed concepts can be used in generating the porous support structures (e.g., varying density of support structure, optional gaps between parts and support structures, optional use of inner part walls, etc.). However, in exemplary embodiments, a porosity of the support structure increases as a distance from an outer surface of the part increases within the print volume. Next, at step 708, the digital representation of the part block, including the part(s) and porous support structures, is sliced. The slices can be output, transmitted to a printer, saved on a computer readable medium such as a computer storage device, etc. Finally, in some embodiments, the method includes printing layers of the part and support material based on the sliced digital representation of the part block.

Although the present disclosure has been described with reference to preferred embodiments, workers skilled in the art will recognize that changes may be made in form and detail without departing from the spirit and scope of the disclosure.

What is claimed is:

1. A method of printing a part in an additive manufacturing system, comprising:
   identifying at least one part to print;
   orienting a digital representation of the at least one identified part in a build volume;

generating a digital representation of a porous support structures for the at least one identified part to form a digital representation of a part block including the at least one identified part and the porous support structures, wherein a porosity of the support structure increases as a distance from a surface of the part increases within the print volume; and slicing the digital representation of the part block including the at least one identified part and the porous support structures; and outputting the sliced digital representation of the part block for use in printing the part and support material.

2. The method of claim 1, wherein generating the porous support structures comprises generating the support structures using a gyroidal lattice.

3. The method of claim 1, wherein generating the porous support structures further comprises generating an inner block wall that substantially encapsulates the part being printed.

4. The method of claim 3, wherein generating the porous support structures further comprises generating the support structures such that a porosity of the support structure is not increasing adjacent to the inner block wall.

5. The method of claim 1, and wherein generating the digital representation of the porous support structure comprises separating the porous support structure from the surface of the at least one identified part by a selected distance.

6. The method of claim 5 and wherein selected distance is in a range of about 0.005 inches and about 0.015 inches.

7. The method of claim 1 and further comprising:
generating a digital representation for an outer wall; and
outputting the outer wall such that the porous support structure is retained in a selected location during the printing process.

8. The method of claim 1 and wherein generating the digital representation of the porous support structure comprises contacting the porous support structure with the surface of the at least one identified part.

9. The method of claim 1 and wherein the printed porous support structure contacts the surface of the printed part.

10. The method of claim 1, and further comprising printing layers of the part and support material based upon the sliced digital representation of the part block.

11. The method of claim 10 and further comprising submerging the completed printed part and the porous support structure in a solvent to cause the support material to be separated from the printed part.

12. A method of printing a plurality of parts in an additive manufacturing system, comprising:
identifying a plurality of parts to print;
locating digital representations of the plurality of parts in a build volume;
generating a digital representation of porous support structures for the plurality of parts to form a digital representation of a part block including the plurality of identified parts and the porous support structures, wherein an inner block wall is generated that is configured to be positioned about at least one of the plurality of parts and a porosity of the support structure increases as a distance from a surface of at least one of the plurality of parts increases in a direction towards a boundary of the print volume;
slicing the digital representation of the part block including the plurality of identified parts and the porous support structures; and
printing layers of the plurality of parts and support material based upon the sliced digital representation of the part block.

13. The method of claim 12, and wherein generating the digital representation of the porous support structure comprises separating the porous support structure from the outer surface of the at least one of the plurality of identified parts by a selected distance.

14. The method of claim 13 and wherein selected distance is in a range of about 0.005 inches and about 0.015 inches.

15. The method of claim 11 and further comprising:
generating a digital representation for an outer wall; and
printing the outer wall such that the porous support structure is retained in a selected location during the printing process.

16. The method of claim 11 and further comprising submerging the completed plurality of printed parts and the porous support structure in a solvent to cause the support material to be separated from the plurality of printed parts.

* * * * *